(12) United States Patent
Tanaka et al.

(10) Patent No.: US 9,348,866 B2
(45) Date of Patent: May 24, 2016

(54) DATABASE PROCESSING METHOD, DATABASE PROCESSING SYSTEM AND DATABASE SERVER

(75) Inventors: Michiko Tanaka, Yokohama (JP); Kazutomo Ushijima, Ebina (JP); Akira Shimizu, Tokyo (JP); Seisuke Tokuda, Ebina (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 13/814,976

(22) PCT Filed: Jan. 31, 2011

(86) PCT No.: PCT/JP2011/051938
§ 371 (c)(1),
(2), (4) Date: Feb. 8, 2013

(87) PCT Pub. No.: WO2012/026140
PCT Pub. Date: Mar. 1, 2012

(65) Prior Publication Data
US 2013/0144867 A1 Jun. 6, 2013

(30) Foreign Application Priority Data
Aug. 25, 2010 (JP) .................. 2010-187798

(51) Int. Cl.
*G06F 17/30* (2006.01)
(52) U.S. Cl.
CPC .... *G06F 17/30463* (2013.01); *G06F 17/30486* (2013.01)

(58) Field of Classification Search
CPC ................ G06F 17/30463; G06F 17/60486
See application file for complete search history.

(56) References Cited

U.S. PATENT DOCUMENTS

| 5,089,985 A | 2/1992 | Chang et al. |
| 6,343,286 B1 * | 1/2002 | Lee et al. |
| 2007/0022100 A1 | 1/2007 | Kitsuregawa et al. |
| 2010/0211577 A1 | 8/2010 | Shimizu et al. |

FOREIGN PATENT DOCUMENTS

| JP | 02-012461 A | 1/1990 |
| JP | 09-231115 A | 9/1997 |
| JP | 2007-034414 A | 2/2007 |
| JP | 2010-186391 A | 8/2010 |

* cited by examiner

*Primary Examiner* — Grace Park
(74) *Attorney, Agent, or Firm* — Mattingly & Malur, PC

(57) ABSTRACT

It is provided a database processing method including: a first step of receiving a query request instructing to output the requested data as query results in a designated order; a second step of generating a query execution plan including an order of accessing tables for storing the data based on the received query request; a third step of acquiring the data requested based on the query request from the database based on the generated query execution plan; a fourth step of generating intermediate results including the acquired data; a fifth step of sorting the generated intermediate results in the designated order; a sixth step of judging, for each of the intermediate results, whether an order of the sorted intermediate results has been determined; and a seventh step of outputting the intermediate results whose order has been determined as the query results in order from a head thereof.

13 Claims, 8 Drawing Sheets

```
select * from T1 T2 T3
where T1.category = "coffee"
  and T1.itemID   = T2.itemID
  and T2.custID   = T3.custID
  and T3.gender   = "F"
  and T3.age between 20 and 29
order by T1.price desc
```

Fig. 4

DATABASE PROCESSING METHOD, DATABASE PROCESSING SYSTEM AND DATABASE SERVER

CROSS-REFERENCE TO RELATED APPLICATIONS

The present application claims priority from Japanese patent application JP 2010-187798 filed on Aug. 25, 2010, the content of which is hereby incorporated by reference into this application.

BACKGROUND OF THE INVENTION

This invention relates to a technology for extracting data from a database, and more particularly, to a technology for extracting sorted data.

In recent years, with an improvement in tools for collecting an enormous volume of data relating to corporate activities, a business data analysis in which an on-site person in charge uses an enormous volume of accumulated sales data for analysis is becoming widespread. In the business data analysis, the analysis is performed stepwise as in hypothesis planning/trend analysis/factor analysis.

In the business data analysis, the on-site person in charge repeats the hypothesis planning and the trend analysis a large number of times after trial and error, which necessitates extraction of an enormous volume of data. Therefore, such an enormous volume of data is managed by the database for effective processing thereof.

In a database system for processing the enormous volume of data, data to be analyzed is stored in a plurality of tables. To extract data, the data stored in the plurality of tables is joined, and the data that satisfies a condition designated by an analyzer is extracted.

Therefore, for a speedup of the processing for extracting such data, Out-of-Order Database Engine has been developed as disclosed in Japanese Patent Application Laid-open No. 2007-34414. Out-of-Order Database Engine enables the speedup of the extraction of data by issuing data read requests to a secondary storage device for storing data in a multiplexing manner.

On the other hand, in the business data analysis, it is necessary to extract necessary data from the enormous volume of data accumulated in the trend analysis and the like and to sort the extracted data in a designated order to facilitate the analysis. As Out-of-Order Database Engine, US 2010/0211577 A1 discloses a technology for sorting data at high speed with respect to a column for which an index has been created.

SUMMARY OF THE INVENTION

However, when an amount of data to be extracted is large, a long processing time is required to sort data in a designated order.

In Out-of-Order Database Engine disclosed in Japanese Patent Application Laid-open No. 2007-34414, it is possible to speed up the extraction of data, but sorting of the extracted data does not make the most of characteristics of Out-of-Order Database Engine. Accordingly, even if the extraction of data is sped up, there is a fear that the sorting of the extracted data may become a bottle neck.

It is an object of this invention to speed up processing for extracting sorted data in a database processing system for acquiring data stored in a secondary storage device.

The representative one of inventions disclosed in this application is outlined as follows. There is provided a database processing method for outputting requested data on a computer on which a database management system for managing a database for storing data is executed. The computer includes a processor for executing the database management system and a memory for storing the database management system. The database processing method includes: a first step of receiving a query request instructing to output the requested data as query results in a designated order; a second step of generating a query execution plan including an order of accessing tables for storing the data based on the received query request; a third step of acquiring the data requested based on the query request from the database based on the generated query execution plan; a fourth step of generating intermediate results including the acquired data; a fifth step of sorting the generated intermediate results in the order designated by the query request; a sixth step of judging, for each of the intermediate results, whether an order of the sorted intermediate results has been determined; and a seventh step of outputting the intermediate results whose order has been determined as the query results in order from a head thereof.

According to a representative embodiment of this invention, it is possible to speed up processing for extracting the sorted data by executing the extraction of the data in parallel with the sorting and returning of the data, to thereby shorten a time from a start of extraction until a start of transmission of a query result.

BRIEF DESCRIPTION OF THE DRAWINGS

FIG. 4 is a diagram illustrating an example of an SQL corresponding to a query request according to the first embodiment of this invention.

DETAILED DESCRIPTION OF THE PREFERRED EMBODIMENTS

First Embodiment

Figure 1:
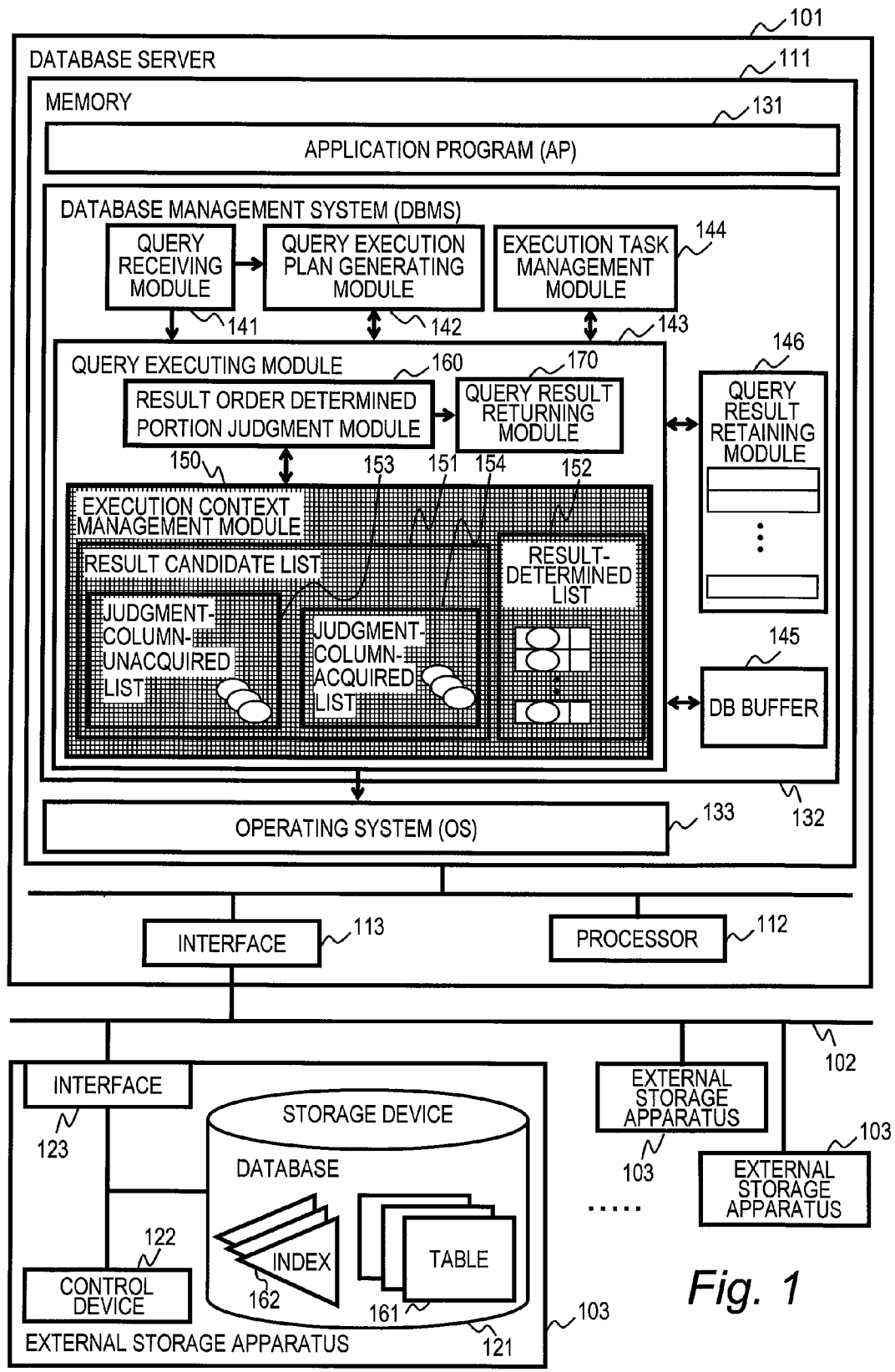
FIG. 1 is a block diagram illustrating a configuration of a computer system according to a first embodiment of this invention.

FIG. 1 is a block diagram illustrating a configuration of a computer system according to a first embodiment of this invention.

The computer system according to the first embodiment of this invention includes a database server 101 and one or more external storage apparatus 103. The database server 101 and the external storage apparatus 103 are coupled to each other through a network 102.

The database server 101 executes a database management system 132 being a program for managing data stored in the external storage apparatus 103. Then, the database server 101 processes a query requested by an application program 131 executed by the database server 101, a client computer (not shown), or the like, and returns a query result.

The database server 101 includes a memory 111, a processor 112, and an interface 113. The memory 111 stores programs including the database management system 132 and data necessary to execute the programs. The processor 112 executes the programs stored in the memory 111 to thereby execute different kinds of processing.

The interface 113 is coupled to the external storage apparatus 103 through the network 102. In a case where the network 102 is a storage area network (SAN), the interface 113 may be a so-called host bus adapter (HBA). When the program stored in the memory 111 is executed, an input/output request is issued to the external storage apparatus 103 through the interface 113 as the need arises.

The network 102 is, for example, the storage area network (SAN) to which a fibre channel (FC) protocol is applied, but may be a network having any other arbitrary form. Specifically, if the network 102 is an internet protocol (IP) network, the database server 101 and the external storage apparatus 103 may communicate with each other via an iSCSI protocol.

The external storage apparatus 103 stores data managed by the database server 101, and reads and writes requested data based on the input/output request transmitted from the database server 101.

The external storage apparatus 103 includes an interface 123, a control device 122, and a storage device 121. The interface 123 is coupled to the network 102. The control device 122 processes the input/output request transmitted from the database server 101.

The storage device 121 stores a database for managing the data read/written in response to the input/output request. The storage device 121 may be a hard disk drive (HDD), an optical disc drive, a semiconductor storage device, or other such storage device. In FIG. 1, one storage device 121 is included in the external storage apparatus 103, but the number of storage devices 121 may be arbitrarily set. Further, a disk array may be structured to include a plurality of storage devices 121.

Subsequently, a description is made of the programs executed by the database server 101. The programs stored in the memory 111 include the application program (AP) 131, the database management system 132, and an operating system (OS) 133.

The processor 112 executes the AP 131 to thereby execute different kinds of application processing. At this time, by the AP 131, the processor 112 issues a query request to the database management system 132, and receives the query result. In the first embodiment of this invention, the AP 131 is executed on the same computer (database server 101) as the database management system 132, but the application program may be configured to be executed on another computer coupled thereto through the network.

The database management system 132 searches the database stored in the external storage apparatus 103 for data that matches a condition designated by a requested query. Then, the data to be a search result (query result) is acquired and returned to a request source.

The database management system 132 includes a relational database management system (RDBMS) based on a relational model or an object-oriented database management system based on an object model. In the first embodiment of this invention, in particular, the RDBMS is employed.

In the RDBMS, data is stored in a table 161 in units of records each of which is formed of a plurality of kinds of data, and an index 162 that allows access to the record with a small number of I/O requests is provided. A data structure of the index 162 may be a B-tree or a hash. The query for the data is described in a structured query language (SQL). In the SQL, an output order designation for the query results is expressed by an "Order by" phrase, and a summation arithmetic operation is expressed by a "Group by" phrase.

It should be noted that, in the first embodiment of this invention, the database management system 132 stores the table 161 and the index 162 in the external storage apparatus 103 coupled thereto through the network 102. In a case where the database server 101 includes a storage device, the table 161 and the index 162 may be stored in the storage device within the database server 101.

The OS 133 is a program for managing resources (processor 112 and memory 111) of the database server 101. Further, the OS 133 receives the input/output request from the database management system 132, and issues the input/output request to the external storage apparatus 103.

In this case, a description is further made of a detailed configuration of the database management system 132. The database management system 132 includes a query receiving module 141, a query executing module 143, a query execution plan generating module 142, an execution task management module 144, a DB buffer 145, and a query result retaining module 146.

The query receiving module 141 receives the requested query request from the AP 131. In addition, the query receiving module 141 analyzes the received query request, and executes the query execution plan generating module 142 or the query executing module 143 based on an analysis result.

The query execution plan generating module 142 generates a query execution plan being a processing procedure for the query request received by the query receiving module 141. The query execution plan is described later.

The query executing module 143 executes processing necessary to process the query requested based on the query execution plan generated by the query execution plan generating module 142.

The query executing module 143 can execute a basic database operation for generating the query result. The query execution plan is a combination of database operations necessary to generate the result corresponding to the query.

The query executing module 143 includes an execution context management module 150, a result order determined portion judgment module 160, and a query result returning module 170.

As described above, the query executing module 143 generates a plurality of tasks to process the query request. Execution contexts that can be executed in parallel logically in the query execution plan are assigned to those plurality of tasks. Further, the execution context includes the processing corresponding to the operation included in the query execution plan. In execution of the execution context, a task is generated for each operation, and the generated task is executed, to thereby execute query processing.

The execution context management module 150 sorts and manages a plurality of execution contexts for each progress of each processing. Further, the execution context management module 150 includes a result candidate list 151 (first list and second list) and a result-determined list 152 (third list), and sorts the execution context into any one of the lists based on the progress of the processing. At this time, intermediate results including data that has been acquired in the execution contexts being processed may be sorted. A procedure for sorting the execution contexts is described later with reference to FIG. 2.

The result candidate list 151 stores (sorts) the execution contexts whose sort results have not been determined among the results of executing a part of the tasks for processing the query. The result candidate list 151 includes a judgment-column-unacquired list 153 (first list) and a judgment-column-acquired list 154 (second list). The judgment-column-unacquired list 153 stores the execution context for which data corresponding to a sort-designated column has not been acquired. On the other hand, the judgment-column-acquired list 154 stores the execution context for which the data corresponding to the sort-designated column has been acquired. The result-determined list 152 stores the execution context for which the result of the query request has been determined.

The result order determined portion judgment module 160 judges a sort order determined portion of the query results with regard to the sorted/managed execution contexts, and notifies the query result returning module 170 of the records for which the sort order has been determined.

Specifically, in a case where there is no execution context that is sorted into the judgment-column-unacquired list 153 of the result candidate list 151, the result order determined portion judgment module 160 refers to the value of the sort-designated column of the execution context that is first in the sort order within the judgment-column-acquired list 154. Then, it is judged that the sort order has been determined for the query results generated by the execution context that precedes the value for which the value of the sort-designated column has been referred to within the result-determined list 152. A procedure for judging the sort order determined portion of the query results is described later with reference to FIG. 3.

The query executing module 143 issues the I/O request to the operating system 133 during the process of the processing for the query request, and retains an I/O result in the DB buffer 145. Then, the result of the query request is saved to the query result retaining module 146.

The query result returning module 170 returns the result of the query request saved in the query result retaining module 146 to the application program 131.

The execution task management module 144 manages the tasks generated for executing the query execution plan.

The DB buffer 145 stores data cached for speeding up the data access.

The query result retaining module 146 saves a result of the query executed by the query executing module 143.

Figure 2:
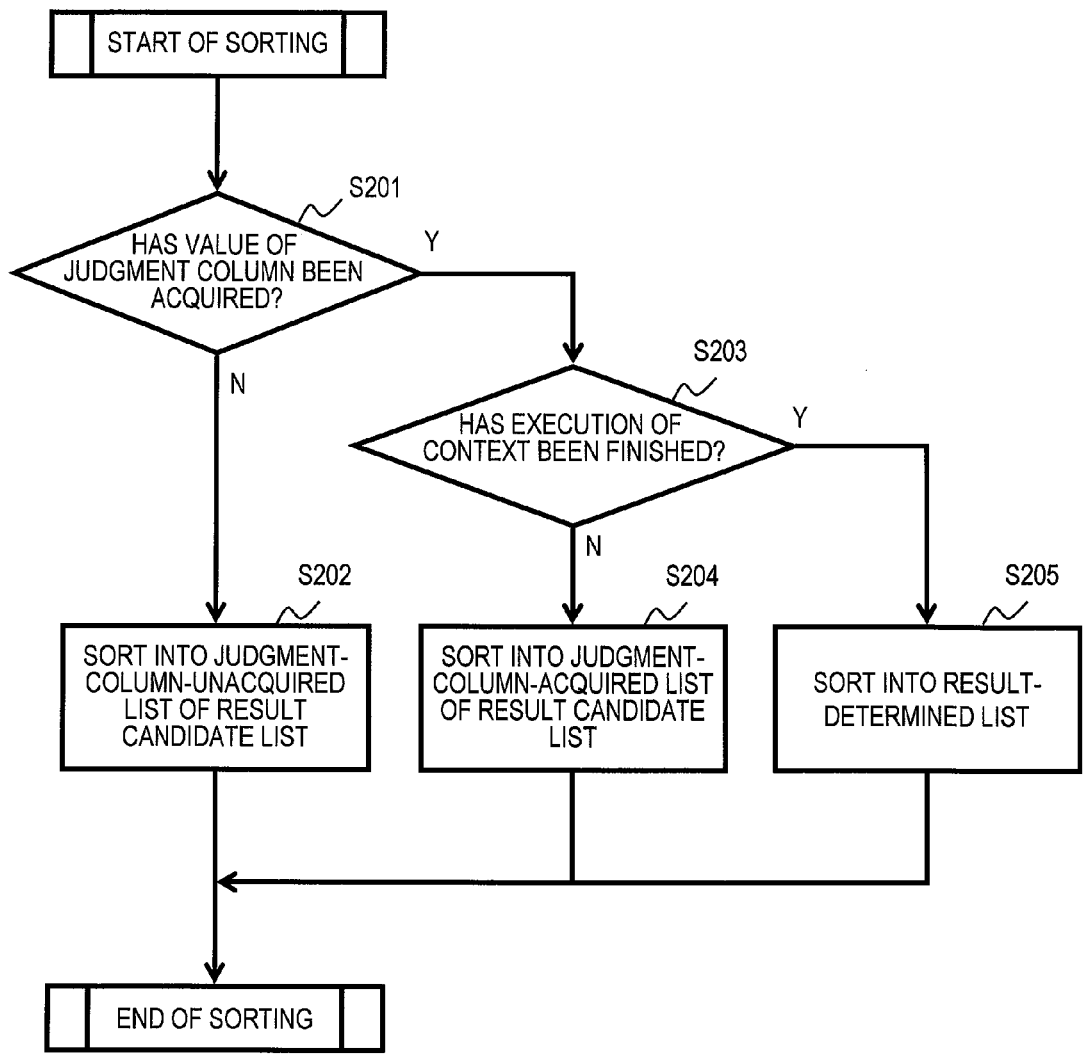
FIG. 2 is a flowchart illustrating a procedure for sorting execution contexts by an execution context management module according to the first embodiment of this invention.

FIG. 2 is a flowchart illustrating a procedure for sorting the execution context by the execution context management module 150 according to the first embodiment of this invention. This processing is executed by executing a program included in the execution context management module 150.

This processing is processing for sorting the execution context that is being processed or has been completed as described above. The sorting of the execution context represents storing (assigning) the execution context that is being processed or has been completed into (to) the result candidate list 151 (judgment-column-unacquired list 153 or judgment-column-acquired list 154) or the result-determined list 152.

Further, in the case of using the result candidate list 151 and the result-determined list 152 to manage the execution context, the data (intermediate result) itself corresponding to the execution context may be managed, or a reference (pointer) to the data may be managed. It should be noted that, in the result-determined list 152, a reference to result data, which has been generated by the execution context sorted into the result-determined list 152 and has been saved in the query result retaining module 146, may be managed.

The processor 112 first selects the execution context, and judges whether or not the value of the sort-designated column, in other words, a column on which the sort order is judged (judgment column) has already been acquired from the table 161 of the database (S201).

When the value of the judgment column has not yet been acquired ("N" as a result of S201), the processor 112 sorts the selected execution context into the judgment-column-unacquired list 153 of the result candidate list 151 (S202).

On the other hand, when the value of the judgment column has already been acquired ("Y" as a result of S201), the processor 112 judges whether or not the execution of the selected execution context has been completed (S203).

When the execution of the selected execution context has not been completed ("N" as a result of S203), the processor 112 sorts the selected execution context into the judgment-column-acquired list 154 of the result candidate list 151 (S204). On the other hand, when the execution of the selected execution context has been completed ("Y" as a result of S203), the processor 112 sorts the selected execution context into the result-determined list 152 (S205).

As described above, in the first embodiment of this invention, the execution contexts are sorted based on whether or not the value of the sort-designated column has been acquired and, in addition, whether or not all the data acquired by the execution context has been acquired. When the values of the sort-designated columns have been acquired for all the execution contexts, in other words, when all the execution contexts have been sorted into the judgment-column-acquired list 154 of the result candidate list 151 or the result-determined list 152, it is judged whether or not the sort order of the query results corresponding to the execution contexts included in the result-determined list 152 has been determined. A procedure for judging whether or not the sort order of the query results has been determined is described with reference to FIG. 3.

Figure 3:
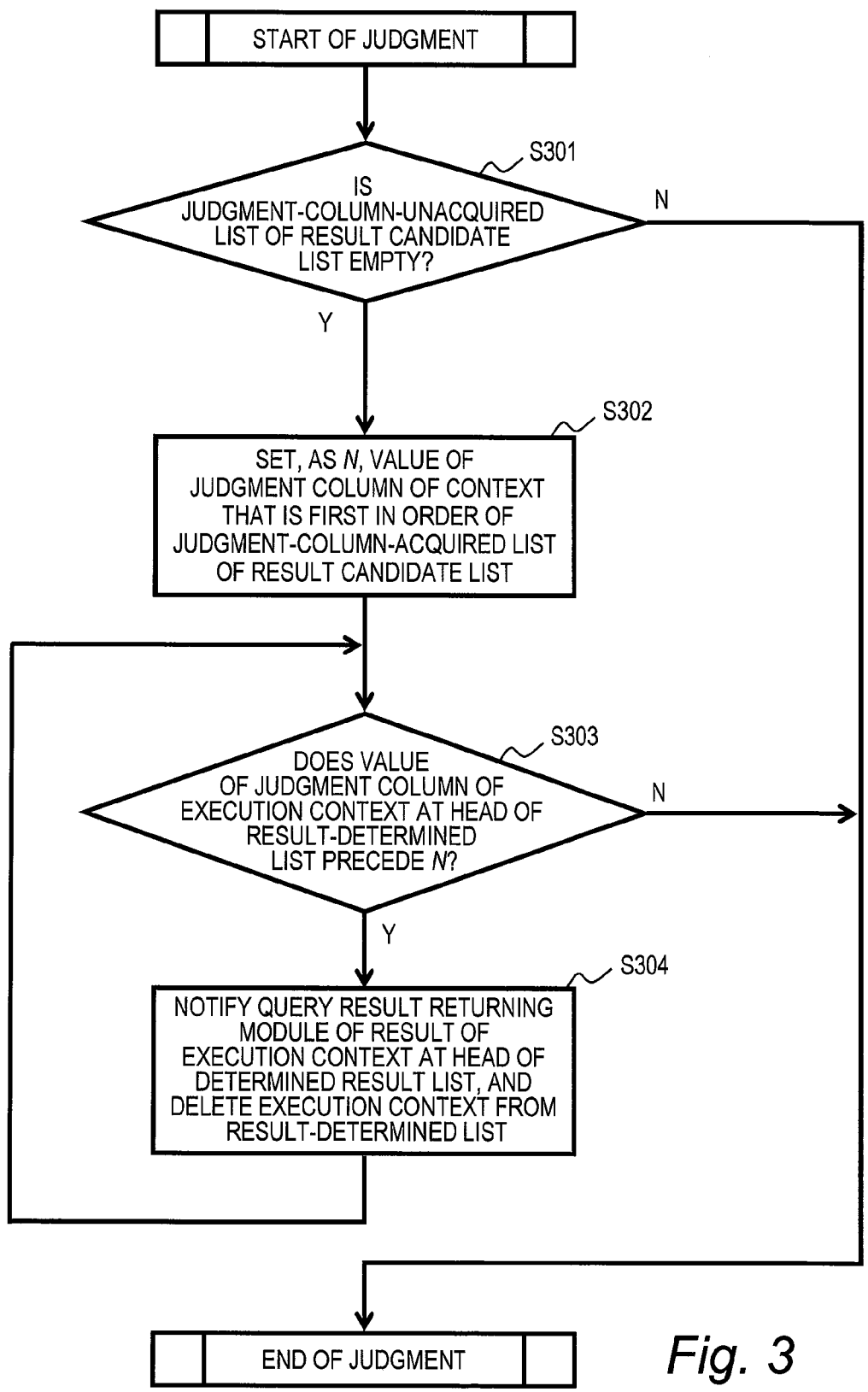
FIG. 3 is a flowchart illustrating a procedure for judging whether a sort order of a query results has been determined by a result order determined portion judgment module according to the first embodiment of this invention.

FIG. 3 is a flowchart illustrating a procedure for judging whether or not the sort order of the query results has been determined by the result order determined portion judgment module 160 according to the first embodiment of this invention.

The processor 112 first judges whether or not the judgment-column-unacquired list 153 of the result candidate list 151 is empty (S301). In other words, the processor 112 judges whether or not all the values of the sort-designated columns have been acquired. When the judgment-column-unacquired list 153 of the result candidate list 151 is not empty ("N" as a result of S301), not all the values to be sorted have been acquired, and the order of the data cannot be determined. Therefore, this processing is brought to an end.

When the judgment-column-unacquired list 153 of the result candidate list 151 is empty ("Y" as a result of S301), all the values of the sort-designated columns to be processed have been acquired, which enables the processor 112 to execute sort processing on at least the execution context sorted into the result-determined list 152. At this time, the values of the sort-designated columns corresponding to the execution contexts sorted into the judgment-column-acquired list 154 of the result candidate list 151 and the result-determined list 152 have been sorted.

Then, the processor 112 sets, as N, the value (order determination judgment value) of the sort-designated column of the execution context that is first in the order within the judgment-column-acquired list 154 of the result candidate list 151 (S302). Then, the processor 112 judges whether or not the value (value of judgment column) of the sort-designated column of the execution context at the head of the result-determined list 152 precedes N (S303). When the value does not precede N ("N" as a result of S303), the execution context for which the sort order has been determined is not included in the result-determined list 152, and hence this processing is brought to an end.

When the value of the judgment column of the execution context at the head of the result-determined list 152 precedes N when sorted ("Y" as a result of S303), the processor 112 notifies the query result returning module 170 of the result of the execution context at the head of the result-determined list 152, and deletes the execution context from the result-determined list 152 (S304). Then, the processor 112 judges whether or not the value of the judgment column of the execution context that has just come to the head precedes N (S303), and executes the processing of Steps S303 and S304 until the value of the judgment column of the execution context at the head does not precede N (or until the result-determined list 152 becomes empty).

In the following, specific descriptions are made of a method of extracting sorted data according to the first embodiment of this invention with reference to the accompanying drawings.

In a specific example described below, the data is extracted from three tables of an item details table (T1), a sales history data table (T2), and a customer table (T3) in a designated order. The query request to extract the data is expressed in a general SQL.

FIG. 4 is a diagram illustrating an example of the SQL corresponding to the query request according to the first embodiment of this invention.

The SQL the query request illustrated in FIG. 4 extracts the data stored in the item details table (T1), the sales history data table (T2), and the customer table (T3), which satisfies the designated condition, in the designated order.

First, before describing the SQL in detail, structures of the item details table (T1), the sales history data table (T2), and the customer table (T3) are described with reference to FIG. 5.

Figure 5:
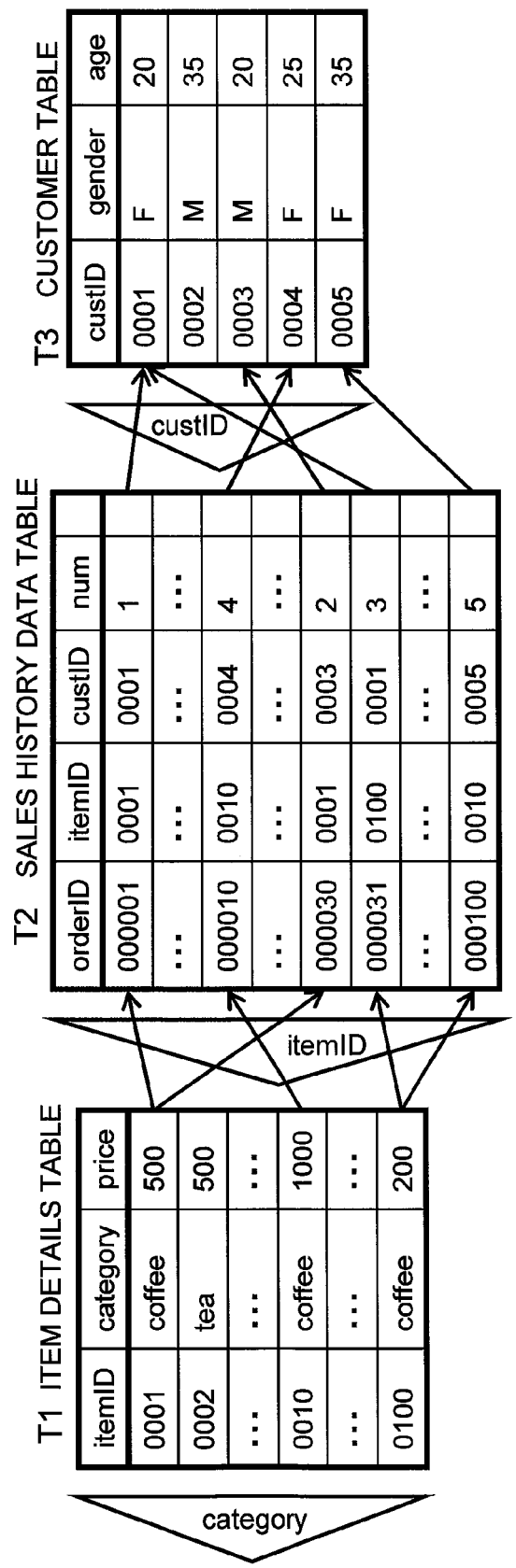
FIG. 5 is a diagram illustrating an example of tables for storing data to be extracted by the query request according to the first embodiment of this invention.

FIG. 5 is a diagram illustrating an example of tables for storing the data to be extracted by the query request according to the first embodiment of this invention.

The three tables of the item details table (T1), the sales history data table (T2), and the customer table (T3) are included in the tables 161 stored in the storage device 121 of the external storage apparatus 103.

The item details table (T1) includes an "itemID" column, a "category" column, and a "price" column.

The value of the "itemID" column is an identifier for identifying a product. The value of the "category" column represents a category of the product identified by the itemID. Specifically, values such as "coffee" and "tea" are set. The value of the "price" column represents a price of the product identified by the itemID.

The sales history data table (T2) includes an "orderID" column, an "itemID" column, a "custID" column, and a "num" column.

The value of the "orderID" column is an identifier for identifying an order. The value of the "itemID" column is an identifier for identifying an ordered product. The value of the "custID" column is an identifier for identifying a customer who has placed the order. The value of the "num" column is the number of the ordered products.

The customer table (T3) includes a "custID" column, a "gender" column, and an "age" column.

The value of the "custID" column is an identifier for identifying the customer. The value of the "gender" column is information indicating a gender of the customer identified by the custID. The value of the "age" column is information indicating an age of the customer identified by the custID.

The description now returns to the SQL illustrated in FIG. 4. The SQL illustrated in FIG. 4 indicates that corresponding records (data) of the item details table (T1), the sales history data table (T2), and the customer table (T3), which satisfies a condition for 20- to 29-year-old females who have ordered coffee, are to be extracted.

To be described in more detail, the value of the "category" column of the item details table (T1) is "coffee", the value of the "itemID" column of the item details table (T1) and the value of the "itemID" column of the sales history data table (T2) are the same, and the value of the "custID" column of the sales history data table (T2) and the value of the "custID" column of the customer table (T3) are the same, in other words, the item details table (T1) and the sales history data table (T2) are joined with each other by the itemID, and the sales history data table (T2) and the customer table (T3) are joined with each other by the custID. Then, the data (records), which satisfies the condition for the value of the "gender" column of the customer table (T3) being "F" and the value of the "age" column of the customer table (T3) being 20 to 29, is extracted from the three joined tables (T1, T2, and T3), and the data is output in a descending order of the value of the "price" column of the item details table (T1).

An arrow connecting between the records of the respective tables illustrated in FIG. 5 expresses a join status between the respective records. To be specific, the record whose value of the "itemID" column of the item details table (T1) is "0001" with the value of the "category" column being "coffee" is joined with two records whose value of the "itemID" column of the sales history data table (T2) is "0001". In addition, the respective values of the "custID" column of the two records are "0001" and "0003", each of which is joined with the corresponding record of the customer table (T3). At this time, in the SQL illustrated in FIG. 4, the condition for "females" who are "20 to 29 years old" is designated, and hence the record whose value of the "custID" column is "0003" is not extracted.

Subsequently, a description is made of the query execution plan (processing order) for indicating the order of accessing the tables and indexes, which is generated based on the SQL illustrated in FIG. 4.

Figure 6:
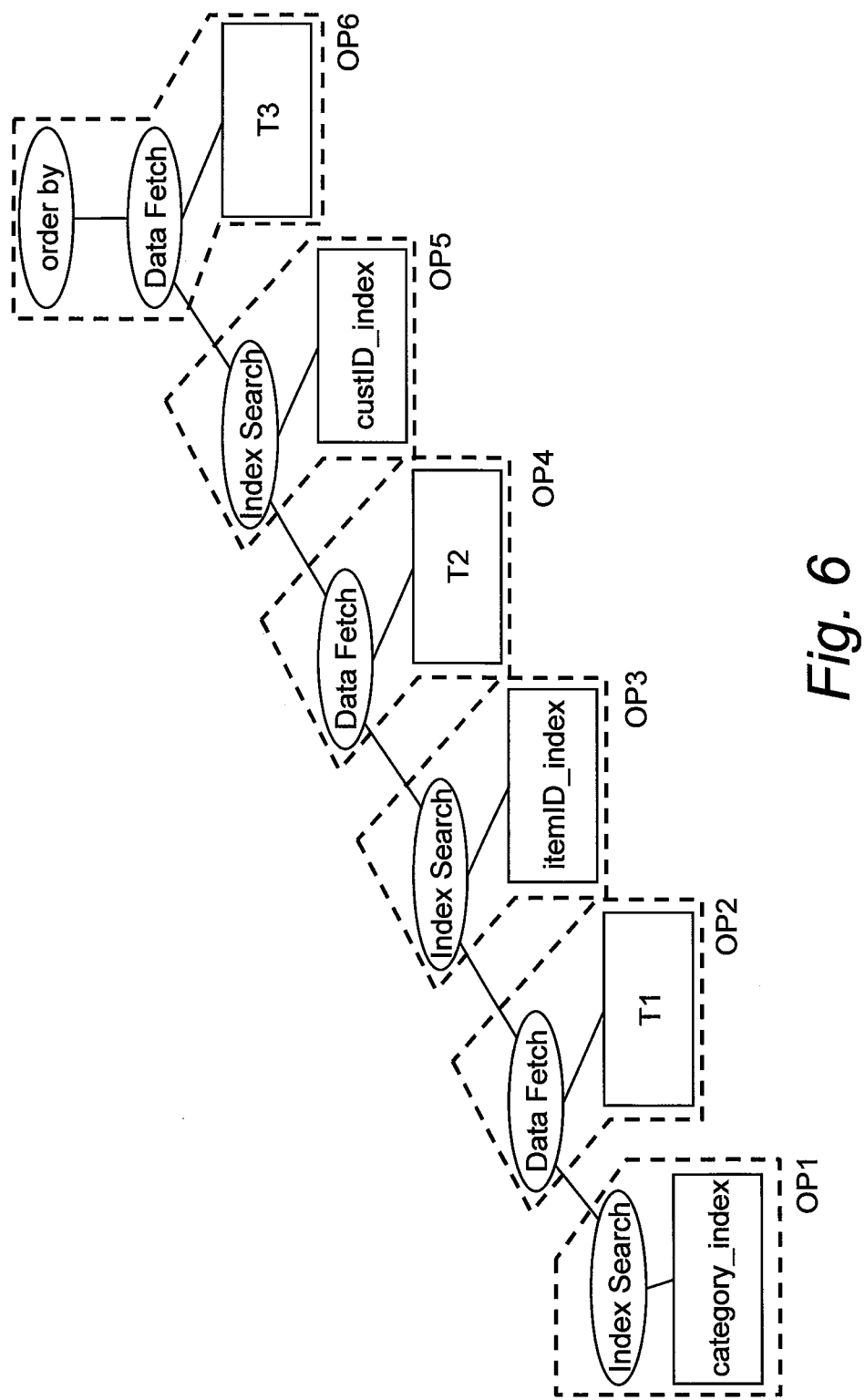
FIG. 6 is a diagram illustrating an example of a query execution plan corresponding to the SQL corresponding to the query request according to the first embodiment of this invention.

FIG. 6 is a diagram illustrating an example of the query execution plan corresponding to the SQL corresponding to the query request according to the first embodiment of this invention.

In the first embodiment of this invention, the indexes are created for the "category" column of the item details table (T1), the "itemID" column of the sales history data table (T2), and the "custID" column of the customer table (T3). Those indexes are included in the indexes 162 stored in the storage device 121 of the external storage apparatus 103.

The query execution plan illustrated in FIG. 6 is formed of six operations (OP1 to OP6), and the query results sorted in Operation OP6 are output. The execution context includes processing of Operations OP1 to OP6, and when a plurality of pieces of data are extracted midway through the operations, is divided into the execution contexts, the number of which corresponds to the number of pieces of the extracted data. The execution contexts obtained by the division can be processed in parallel with one another.

Further, as described above, the query executing module 143 generates a task for each operation in order to execute the respective operations that form the query execution plan generated by the query execution plan generating module 142. The tasks generated by the same execution contexts are sequentially executed based on an execution order of the operations, while the tasks generated by the different execution contexts can be executed in parallel.

In the query execution plan illustrated in FIG. 6, the query executing module 143 first uses the index of the "category" column of the item details table (T1) to search for the record whose value of the "category" column is "coffee", and acquires the retrieved record from the table T1.

Subsequently, the query executing module 143 uses the index of the "itemID" column of the sales history data table (T2) to search for the record having the same value of the "itemID" column as the value of the "itemID" column of the record acquired from the item details table (T1). Then, the query executing module 143 acquires the retrieved record from the sales history data table (T2), and joins the retrieved record with the record acquired from the item details table (T1).

Subsequently, the query executing module 143 uses the index of the "custID" column of the customer table (T3) to search for the row having the same value of the "custID" column as the value of the "custID" column of the record acquired from the sales history data table (T2), and acquires the retrieved record from the customer table (T3). In addition, the query executing module 143 judges whether or not the acquired record satisfies the condition for the "gender" column having the value of "F (female)" and the "age" column having the value of 20 to 29. When the condition is satisfied, the record generated by joining the records acquired from the tables T1 and T2 and the record acquired from the customer table (T3) are joined with each other and saved to the query result retaining module 146.

In a case of returning the query result, the query executing module 143 returns the record, which is the result saved in the query result retaining module 146 and which is obtained by joining the values of the "price" column of the item details table (T1) in descending order, to a transmission source of the query request.

Subsequently, a process of acquiring data and outputting the query result is described based on the query execution plan illustrated in FIG. 6.

Figure 7:
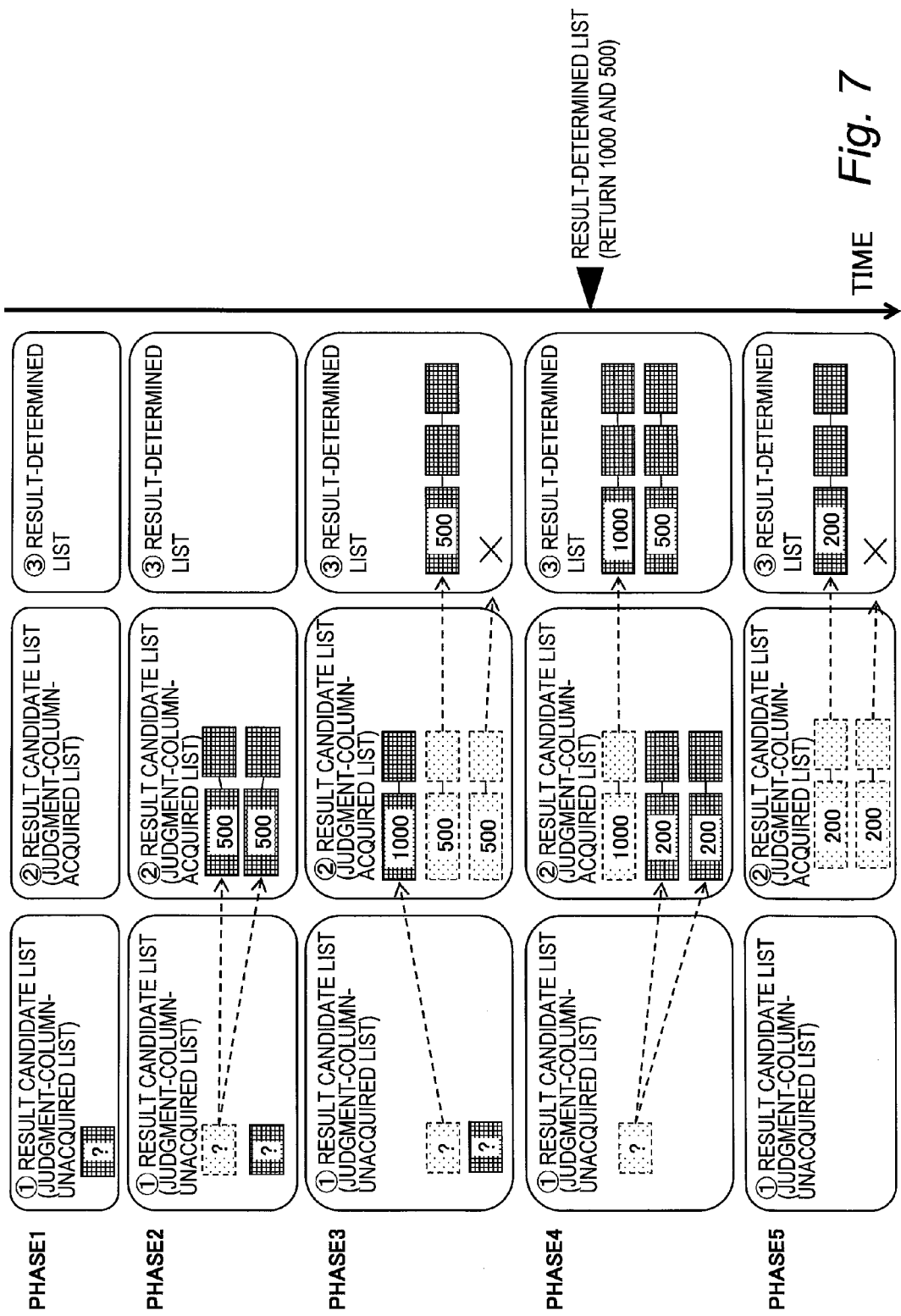
FIG. 7 is a diagram illustrating a specific example of a process of extracting sorted data from a database and outputting data as the query result according to the first embodiment of this invention.

FIG. 7 is a diagram illustrating a specific example of a process of extracting sorted data from the database and outputting the data as the query result according to the first embodiment of this invention.

In the query execution plan illustrated in FIG. 6, one execution context is formed of a series of processing for retrieving and extracting the query result obtained by joining the corresponding records of the sales history data table (T2) and the customer table (T3) by using the data corresponding to one record of the item details table (T1) illustrated in FIG. 5. Accordingly, the execution contexts are generated for the respective rows whose value of the "category" column is "coffee" at a stage before the execution context is divided. Those execution contexts can be processed in parallel.

FIG. 7 illustrates phase1 indicating a status immediately after the execution of the query processing is started. Specifically, phase1 indicates the status in which, in the execution context executed at first, an index search processing portion of the "category" column of the item details table (T1) is executed by one task. In other words, phase1 indicates the status in which Operation OP1 of the query execution plan of FIG. 6 has been finished. The execution context in phase1 is sorted into the judgment-column-unacquired list 153 of the result candidate list 151 because the value of "price" of the item details table (T1) being the sort-designated column has not been acquired (S202 of FIG. 2).

FIG. 7 illustrates phase2 indicating a status in which the processing has progressed after phase 1 described above. Specifically, the execution context acquires the first record whose value of the "category" column is "coffee" from the item details table (T1), and the corresponding value of the "price" column turns out to be 500. At this stage, phase2 indicates the status in which Operation OP2 of the query execution plan of FIG. 6 has been finished.

Subsequently, based on the value of the "itemID" column (specifically, "0001") of the item details table (T1), an index search is executed for the "itemID" column of the sales history data table (T2) (OP3), and the corresponding record is acquired from the sales history data table (T2) (OP4). At this time, two records are acquired from the sales history data table (T2), and hence the execution context is divided into two.

In phase2, the value of the sort-designated column is acquired, and is therefore sorted into the judgment-column-acquired list 154 of the result candidate list 151 (S204 of FIG. 2). Further, another execution context in which index search processing for the "category" column of the item details table (T1) has been started in parallel is sorted into the judgment-column-unacquired list 153 of the result candidate list 151. At a stage after phase2 is finished, phase2 indicates the status in which Operation OP4 of the query execution plan of FIG. 6 has been finished.

FIG. 7 illustrates phase3 indicating a status in which the processing has further progressed after phase2. Specifically, the processing for the execution context in which the value of the "price" column is 500 has further progressed, and the acquisition of the record of the customer table (T3) and the judgment of the condition have been finished. At this time, phase3 indicates the status in which Operation OP6 of the query execution plan of FIG. 6 has been finished. Accordingly, the execution context is sorted into a "result-determined list" (S205 of FIG. 2).

It should be noted that the other one of the execution contexts obtained by the division in phase2 does not satisfy a search condition and is therefore not sorted into the result-determined list 152. The execution context that does not satisfy the search condition is discarded at a time point when it turns out that the search condition is not satisfied, and is not sorted into any list.

In phase4, there is no more execution context to be sorted into the judgment-column-unacquired list 153 of the result candidate list 151, and hence the results whose sort order has been determined are judged from the result-determined list 152. In other words, all the values have been acquired at least in the sort-designated column of the records that can satisfy the search condition. Accordingly, the execution context having the largest value of the "price" column being the sort-designated column among the execution contexts sorted into the judgment-column-acquired list 154 of the result candidate list 151 is acquired, and the value of the "price" column is set as the order determination judgment value (S302 of FIG. 3). When the execution context whose value of the "price" column is larger than the order determination judgment value is sorted into the result-determined list 152, the execution context can be returned as the query result to the request source.

To be specific, in phase4 of FIG. 7, the value of the "price" column of the execution context sorted into the judgment-column-acquired list 154 of the result candidate list 151 is 200, and the order determination judgment value is set as 200.

Then, the execution contexts (1000 and 500) whose value of the "price" column is equal to or more than 200 are selected from the execution contexts of the result-determined list 152. It is possible to determine the order of the records (intermediate results) generated by the selected execution context, and hence the records generated by the selected execution context are sorted in the order of the value of the "price" column. Then, the query result returning module 170 is notified of those records, and starts to return the query results before all the search processing for the query request is finished.

It should be noted that, in a case where the execution contexts are sorted into the judgment-column-acquired list 154 of the result candidate list 151 or the result-determined list 152, it is preferred that the execution contexts be previously sorted within each list in the order designated by the received query request.

In a case where the sorting is performed within the result-determined list 152 by using the value of the sort-designated column, the value of the sort-designated column and the order determination judgment value may be compared with each other in order from the execution context at the head, the comparison may be canceled at a time when the value of the sort-designated column no longer precedes the order determination judgment value, and the query result returning module 170 may be notified of the records (intermediate results) of the execution contexts subjected to the comparison within the result-determined list 152. Further, the query result returning module 170 may be notified thereof at the time of the comparison.

Further, in a case where the sorting is performed within the judgment-column-acquired list 154 of the result candidate list 151 by using the value of the sort-designated column, the value of the sort-designated column of the execution context at the head can be set as the order determination judgment value, and processing for acquiring the order determination judgment value can be made more efficient.

In addition, when a sorting destination of a context is changed from the judgment-column-acquired list 154 of the result candidate list 151 to the result-determined list 152, a storage location within the result-determined list 152 can be determine by performing the comparison in order from the head of the list.

At this time, the data structure in which the execution contexts sorted into the result-determined list 152 and the judgment-column-acquired list 154 of the result candidate list 151 are managed in the order of the value of the sort-designated column may be a one-way list or a two-way list. Further, the data structure may be a tree structure.

Further, in the case where the execution contexts within the list are managed in the order of the value of the sort-designated column, the sort processing may be executed each time the execution context is inserted into the list, may be executed at a timing at which a predetermined number of execution contexts are sorted, or may be executed at another arbitrary timing.

Further, the result order determined portion judgment module 160 executes order determination judgment for the first time at a timing immediately after there is no more execution context in the judgment-column-unacquired list 153 of the result candidate list 151. After that, the order determination judgment may be executed at a timing at which the user requests to return the result or at a timing at which a fixed number of records (query results) or more are inserted into the query result retaining module 146.

Further, in the first embodiment of this invention, if the acquisition of the value of the sort-designated column is completed for all the execution contexts as early as possible, the returning of the query result can be started at an earlier timing. Accordingly, in the case of generating the query execution plan, by setting the table including the sort-designated column to be accessed earlier, the returning of the query result can be started at an earlier timing.

It should be noted that, the execution task management module 144 can manage the execution order of the plurality of execution contexts, and by most preferentially executing the execution contexts sorted into the judgment-column-unacquired list 153 of the result candidate list 151 and then preferentially executing the execution contexts sorted into the judgment-column-acquired list 154 of the result candidate list 151, it is possible to further shorten a time from a start of the query processing until a start of the query result returning processing.

According to the first embodiment of this invention, it is possible to sequentially return the query results sorted before all the query results are acquired. Accordingly, it is possible to shorten the time from the start of the query processing until the start of the query result returning processing. Further, the query results sorted into the result-determined list 152 are previously sorted and stored based on the value of the sort-designated column, and hence there is no need to sort the data after all the results are extracted.

Further, according to the first embodiment of this invention, the values of the sort-designated column can be sorted without using the index, and hence the sorted data can be extracted speedily even if the sorting is performed by using the sort-designated column whose index has not been created.

Modified Example of First Embodiment

In the first embodiment described above, this invention is applied to an out-of-order database capable of executing the reading of the data in parallel for the plurality of execution contexts, but may be applied to a general database other than the out-of-order database. In the following, this is a described as a modified example of the first embodiment.

The general database other than the out-of-order database is similar to the system configuration illustrated in FIG. 1 except that the database management system 132 does not include the execution task management module 144. In other words, the execution contexts are executed in succession in one task, and hence the number of execution contexts processed at the same time is one.

Accordingly, the execution context whose processing has not been started is sorted into the judgment-column-unacquired list 153 of the result candidate list 151, and the execution context that is being processed is sorted into the judgment-column-acquired list 154 of the result candidate list 151. Then, the execution context whose processing has been finished is sorted into the result-determined list 152.

At this time, by managing the result-determined list 152 in the order of the sort-designated column, an order determined portion of the result-determined list 152 is returned at a time point when the last execution context is sorted into the judgment-column-acquired list 154 of the result candidate list 151.

As described above, according to the modified example of the first embodiment of this invention, the query result cannot be returned midway through the query processing, but by sorting and managing the results of the execution contexts sorted into the result-determined list 152 based on the value of the sort-designated column, the sort processing becomes unnecessary after result extraction processing, which can speed up processing for extracting the sorted data.

Second Embodiment

Next, a second embodiment of this invention is described. In the first embodiment, this invention is applied to the out-of-order database, but the second embodiment is applied to a parallel database system in which the query requests are processed in parallel by a plurality of computers. Hereinafter, descriptions are made of points in which the second embodiment is different from the first embodiment.

Figure 8:
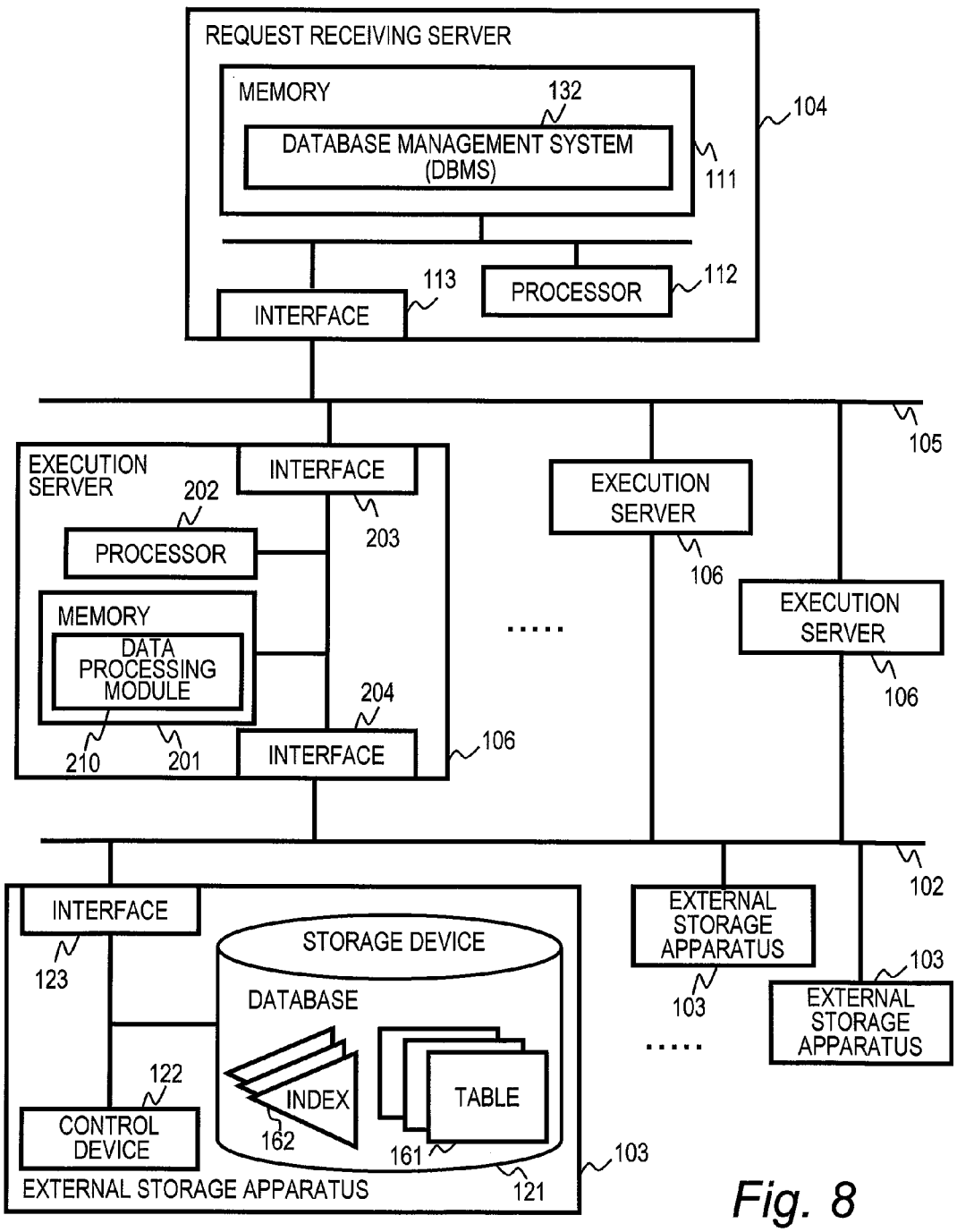
FIG. 8 is a block diagram illustrating a configuration of a computer system according to a second embodiment of this invention.

FIG. 8 is a block diagram illustrating a configuration of a computer system according to a second embodiment of this invention.

The computer system according to the second embodiment of this invention includes a request receiving server 104, a plurality of execution servers 106, and external storage apparatus 103.

The request receiving server 104 and the plurality of execution servers 106 are coupled to each other through a network 105. The plurality of execution servers 106 and the external storage apparatus 103 are coupled to each other through a network 102.

In the same manner as the database server 101, the request receiving server 104 includes a memory 111, a processor 112, and an interface 113. The memory 111 stores a database management system 132. The interface 113 is coupled to the network 105.

The execution server 106 includes a memory 201, a processor 202, an interface 203, and an interface 204. The memory 201 stores a data processing module 210 for acquiring data from the external storage apparatus 103. The interface 203 is coupled to the request receiving server 104 through the network 105. The interface 204 is coupled to the external storage apparatus 103 through the network 102.

The request receiving server 104 receives the query request, and assigns the execution context to the execution server 106. In other words, the request receiving server 104 generates the plurality of execution contexts in the same manner as the database server 101 according to the first embodiment. At this time, without directly accessing the external storage apparatus 103, the request receiving server 104 transmits information necessary to process the execution context to the execution server 106.

The execution server 106 acquires the query result by causing the data processing module 210 to process the execution context designated by the request receiving server 104. The execution server 106 can process only one execution context at the same time in the same manner as a general database server.

The request receiving server 104 retains the result candidate list 151 and the result-determined list 152 in the same manner as the database server according to the first embodiment. The request receiving server 104 selects the execution server 106 for processing the execution context after generation of the query execution plan. After assigning the selected execution context to the selected execution server 106, the request receiving server 104 instructs the selected execution server 106 to start the processing. At this time, the request receiving server 104 sorts the assigned execution context to the judgment-column-unacquired list 153 of the result candidate list 151.

The execution server 106 processes the assigned execution context, and when acquiring the value of the sort-designated column, transmits the intermediate result to the request receiving server 104. When receiving the intermediate result whose value of the sort-designated column has been acquired, the request receiving server 104 sorts the corresponding execution context into the judgment-column-acquired list 154 of the result candidate list 151.

After that, the execution server 106 continues the processing for the execution context, and when the execution of all the operations is completed, transmits the processing results to the request receiving server 104. The request receiving server 104 sorts the execution contexts corresponding to the received processing results into the result-determined list 152.

It should be noted that, in a case where the execution context is divided into a plurality of pieces while the execution server 106 is processing the execution context, the execution contexts may be sequentially processed by the execution server 106, or the execution contexts except one execution context may be transmitted to the request receiving server 104 to be assigned to the other execution servers 106 by the request receiving server 104.

As described above, according to the second embodiment of this invention, this invention can be applied to the existing parallel database system. Accordingly, by causing the respective execution servers 106 to read the data and causing the request receiving server to manage the result candidate list 151 and the result-determined list 152, the sorted query results can be sequentially returned before all the query results are acquired, which can speed up the processing for extracting the sorted data.

While the present invention has been described in detail and pictorially in the accompanying drawings, the present invention is not limited to such detail but covers various obvious modifications and equivalent arrangements, which fall within the purview of the appended claims.

What is claimed is:

1. A database processing method for outputting requested data on a computer which executes a database management system for managing a database storing data in a plurality of tables containing a plurality of records each including one or more columns, the computer including a processor executing the database management system and a memory storing the database management system, the database processing method comprising:

a first step of receiving a query request instructing to sort requested data based on values of a sort-designated column of the requested data and output the requested data as query results in a designated order;

a second step of generating a query execution plan including an order of accessing the tables of the database storing the requested data based on the received query request;

a third step of acquiring data from the database based on the generated query execution plan;

a fourth step of generating intermediate results including the acquired data in units of the records;

a fifth step of sorting the generated intermediate results in the designated order based on the values of the sort-designated column;

a sixth step of judging, for each of the intermediate results, whether an order of the sorted intermediate results, in which the sort-designated column has been acquired, has been determined; and a seventh step of outputting the intermediate results whose order has been determined as the query results in the designated order, wherein:
in the third step, the data is acquired for each of the one or more columns,
in the fourth step, the intermediate results are generated in units of the records each including one or more columns,
in the sixth step, it is judged that the designated order has not been determined in a case where at least part of the data corresponding to the one or more columns that compose each of the records has not been acquired,
the records of one of the tables includes the sort-designated column storing the values for determining the designated order of the query results,
the fourth step includes an eighth step of classifying the intermediate results generated into any one of a first list including the intermediate results whose value of the sort-designated column has not been acquired, a second list including the intermediate results whose value of the sort-designated column has been acquired and for which at least part of the data corresponding to the one or more columns that compose the record has not been acquired, and a third list including the intermediate results for which all the data corresponding to the one or more columns that compose the record has been acquired,
in the fifth step, the intermediate results included in the third list are sorted in the designated order,
the sixth step includes a ninth step of judging whether there is an intermediate result classified into the first list, and a tenth step of acquiring, as an order determination judgment value, the value of the sort-designated column of the intermediate result that is first in order when the intermediate results classified into the second list are sorted in the designated order,
in the sixth step, it is judged that the order has been determined for the intermediate result which has been classified into the third list and which has the value of the sort-designated column that precedes the intermediate result having the order determination judgment value in a case where there is no intermediate result classified into the first list, and
in the seventh step, the intermediate results which have been classified into the third list and for which the order has been determined are outputted as the query results in the designated order.

2. The database processing method according to claim 1, wherein
the third step further includes steps of:
generating an execution context which includes processing for acquiring the query result and which is a processing unit that is executable in parallel with another execution context based on the query execution plan; and
acquiring the data by processing the execution context, and
in the ninth step, it is judged that there is no intermediate result classified into the first list in a case where all the execution contexts for acquiring the value of the sort-designated column have been completed.

3. The database processing method according to claim 2, wherein the eighth step includes steps of:
sorting the generated intermediate results into the second list in a case where acquisition of the value of the sort-designated column is completed during a process of processing the execution context; and
sorting the generated intermediate results into the third list in a case where the processing for acquiring the query result which is included in the execution context is completed.

4. The database processing method according to claim 2, wherein, in the third step, the execution context whose value of the sort-designated column has not been acquired is preferentially processed.

5. The database processing method according to claim 2, wherein the third step further includes:
a step of preferentially processing the execution context that is first in order based on the value of the sort-designated column of the intermediate result among the execution contexts corresponding to the intermediate results classified into the second list.

6. The database processing method according to claim 1, wherein:
the fifth step includes a step of sorting the intermediate results classified into the second list in the designated order; and
in the tenth step, the value of the sort-designated column of the intermediate result at the head which is classified into the second list is set as the order determination judgment value.

7. The database processing method according to claim 1, wherein in the second step, the query execution plan is generated so that the table including the sort-designated column is preferentially accessed.

8. The database processing method according to claim 1, wherein, in the sixth step, it is judged whether the order of the sorted intermediate results has been determined in a case where an output request for the query result is received.

9. The database processing method according to claim 1, wherein, in the sixth step, it is judged whether the order of the sorted intermediate results has been determined in a case where a number of the generated intermediate results exceeds a predetermined number.

10. A database processing system, comprising:
a storage device for storing data; and
a computer which executes a database management system for managing the data stored in the storage device as a database storing the data in a plurality of tables containing a plurality of records each including one or more columns, and outputting requested data,
wherein the computer includes a memory storing the database management system and a processor executing the database management system including:
a query request receiving module to receive a query request instructing to sort requested data based on values of a sort-designated column of the requested data and output the requested data as query results in a designated order;
a query execution plan generating module to generate a query execution plan including an order of accessing the tables of the database storing the requested data based on the received query request; and
a query executing module to acquire data from the database based on the generated query execution plan, processing the acquired data, and outputting the query results in response to the query request, and
wherein the query executing module is configured to:
generate intermediate results including the acquired data in units of the records and classify the generated intermediate results into any one of a first list including the intermediate results whose value of the sort-designated column has not been acquired, a second list including the intermediate results whose value of the sort-designated column has been acquired and for which at least part of the data corresponding to the one or more columns that compose the record has been not acquired, and a third list including the intermediate results for which all the data corresponding to the one or more columns that compose the record has been acquired;

sort the generated intermediate results in the designated order based on the values of the sort-designated column including to sort the intermediate results classified into the third list in the designated order;

judge, for each of the intermediate results, whether an order of the sorted intermediate results, in which the sort-designated column has been acquired, has been determined, including to judge whether there is an intermediate result classified into the first list and acquire, as an order determination judgment value, the value of the sort-designated column of the intermediate result that is first in order when the intermediate results classified into the second list are sorted in the designated order, such that there is a judgment that the order has been determined for the intermediate result which has been classified into the third list and which has the value of the sort-designated column that precedes the intermediate result having the order determination judgment value in a case where there is no intermediate result classified into the first list; and output the intermediate results whose order has been determined as the query results in the designated order including to output the intermediate results which have been classified into the third list and for which the order has been determined as the query results in the designated order.

11. The database processing system according to claim 10, wherein the query executing module is further configured to:

generate an execution context which includes processing for acquiring the query result and which is a processing unit that is executable in parallel with another execution context based on the query execution plan;

acquire the data by processing the execution context; and judge that there is no intermediate result classified into the first list when all the execution contexts for acquiring the value of the sort-designated column have been completed.

12. The database processing system according to claim 11, wherein the query executing module is further configured to:

sort the generated intermediate results into the first list in a case where the execution context for acquiring the value of the sort-designated column is completed; and sort the generated intermediate results into the third list in a case where all the execution contexts included in the query execution plan are completed.

13. A database server on which a database management system for managing data stored in a storage device as a database is executed to output requested data from the database, where the database stores the data in a plurality of tables containing a plurality of records each including one or more columns, the database server comprising:

a processor for executing the database management system; and a memory for storing the database management system, wherein the processor is configured to:

receive a query request instructing to sort requested data based on values of a sort-designated column of the requested data and output the requested data as query results in a designated order;

generate a query execution plan including an order of accessing the tables of the database storing the requested data based on the received query request;

acquire data from the database based on the generated query execution plan;

generate intermediate results including the acquired data in units of the records and classify the generated intermediate results into any one of a first list including the intermediate results whose value of the sort-designated column has not been acquired, a second list including the intermediate results whose value of the sort-designated column has been acquired and for which at least part of the data corresponding to the one or more columns that compose the record has been not acquired, and a third list including the intermediate results for which all the data corresponding to the one or more columns that compose the record has been acquired;

sort the generated intermediate results in the designated order based on the values of the sort-designated column including to sort the intermediate results classified into the third list in the designated order;

judge, for each of the intermediate results, whether an order of the sorted intermediate results, in which the sort-designated column has been acquired, has been determined, including to judge whether there is an intermediate result classified into the first list and acquire, as an order determination judgment value, the value of the sort-designated column of the intermediate result that is first in order when the intermediate results classified into the second list are sorted in the designated order, such that there is a judgment that the order has been determined for the intermediate result which has been classified into the third list and which has the value of the sort-designated column that precedes the intermediate result having the order determination judgment value in a case where there is no intermediate result classified into the first list; and output the intermediate results whose order has been determined as the query results in the designated order including to output the intermediate results which have been classified into the third list and for which the order has been determined as the query results in the designated order.

* * * * *